United States Patent [19]
Toide et al.

[11] Patent Number: 5,293,373
[45] Date of Patent: Mar. 8, 1994

[54] OPTICAL DISK AND METHOD OF MANUFACTURING THE SAME

[75] Inventors: Yukari Toide; Motohisa Taguchi; Yoshio Fujii, all of Amagasaki, Japan

[73] Assignee: Mitsubishi Denki Kabushiki Kaisha, Tokyo, Japan

[21] Appl. No.: 64,731

[22] Filed: May 19, 1993

Related U.S. Application Data

[63] Continuation of Ser. No. 750,884, Aug. 26, 1991, abandoned.

[30] Foreign Application Priority Data

| Aug. 29, 1990 | [JP] | Japan | 2-231974 |
| Aug. 29, 1990 | [JP] | Japan | 2-231975 |
| Nov. 9, 1990 | [JP] | Japan | 2-305214 |
| Nov. 19, 1990 | [JP] | Japan | 2-315182 |
| Nov. 19, 1990 | [JP] | Japan | 2-315184 |

[51] Int. Cl.⁵ ............................................. G11B 7/24
[52] U.S. Cl. ............................... 369/275.5; 369/288; 369/284; 369/286
[58] Field of Search ............ 369/284, 286, 288, 275.1, 369/275.5; 346/135.1

[56] References Cited

U.S. PATENT DOCUMENTS

| 4,710,418 | 12/1987 | Takano et al. | 346/135.1 |
| 4,831,608 | 5/1989 | Tsukane et al. | 369/288 |
| 5,013,594 | 5/1991 | Mizumura et al. | 369/284 |

FOREIGN PATENT DOCUMENTS

| 60-197964 | 10/1985 | Japan. | |
| 63-31042 | 2/1988 | Japan | 369/275.1 |
| 63-70945 | 3/1988 | Japan. | |
| 1-292639 | 11/1989 | Japan. | |
| 2-108257 | 4/1990 | Japan | 369/286 |
| 2-108258 | 4/1990 | Japan | 369/286 |
| 2-203436 | 8/1990 | Japan. | |
| 2-203439 | 8/1990 | Japan. | |

*Primary Examiner*—Hoa T. Nguyen
*Attorney, Agent, or Firm*—Wolf, Greenfield & Sacks

[57] ABSTRACT

An optical disk having a warp preventive film for preventing the warp of the substrate which does not exfoliate for a long period by forming the warp preventive film on a textured area on the substrate surface with a minute embossment, and a method of manufacturing the optical disk by controlling the plasma etching condition for forming a textured area for reinforcing the bonding force of the warp preventive film on the substrate surface, so that the warp preventive film being bonded after forming the textured area may not exfoliate for a long period.

14 Claims, 8 Drawing Sheets

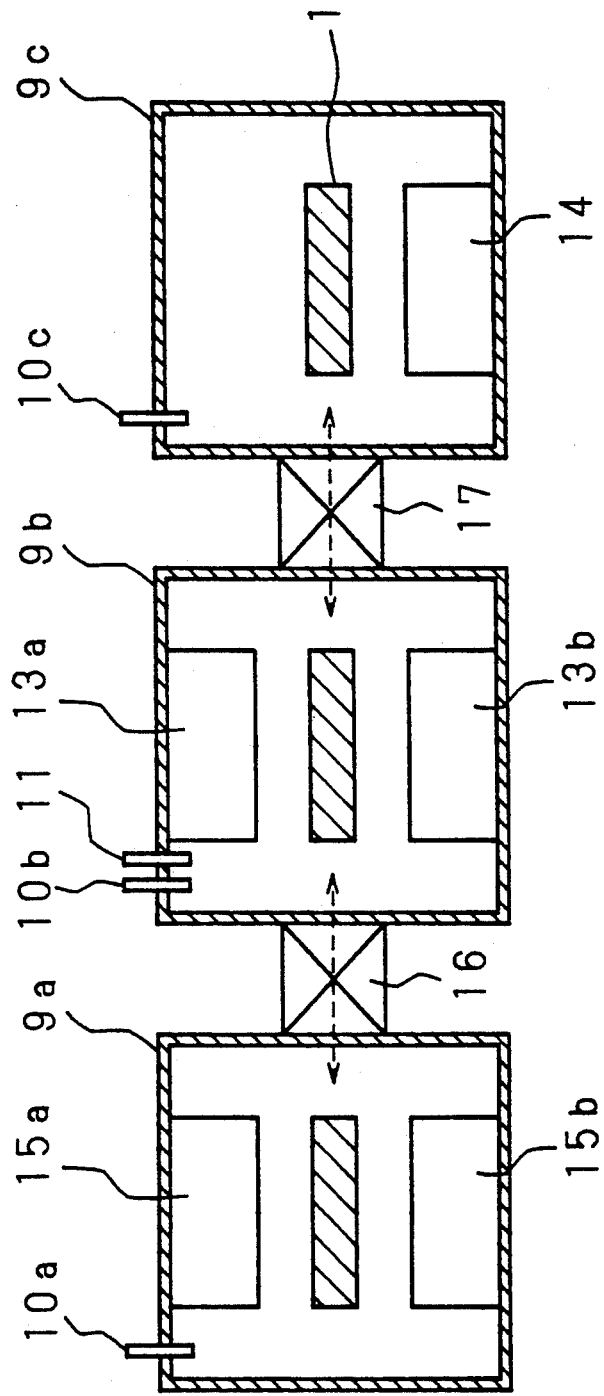

OPTICAL DISK AND METHOD OF MANUFACTURING THE SAME

This application is a continuation, of application Ser. No. 750,884, filed Aug. 26, 1991 now abandoned.

BACKGROUND OF THE INVENTION

Field of the Invention

The present invention relates to an optical disk for optically recording and reproducing information, and a method of manufacturing the same.

Description of Related Art

FIG. 1 is a partial sectional view of a conventional optical disk as disclosed, for example, in the Japanese Patent Applications Laid Open Nos. 60-197964(1985), 1-292639(1989). In the diagram, numeral 1 denotes a transparent plastic substrate of polycarbonate, 3 denotes a recording layer of TbFeCo magnetic film, 5 denotes a protective layer of epoxy resin, and 6 denotes a warp preventive layer of $Si_3N_4$ dielectrics as a surface hardening film and moisture-proof film for the substrate. On the plastic substrate 1, moreover, guide grooves 1a are formed on the side of laminating the recording layer 3.

Generally, transparent plastics which is easy to duplicate and excellent in mass productivity is widely used as the substrate material for an optical disk.

However, the plastic substrate may warp due to hydrolysis if it is let stand in a damp state for a long time, or when the environment varies, the substrate may warp due to temporarily absorbing moisture. When the disk largely warps, the follow-up of the actuator in focus servo control becomes unstable, which results in faulty operation or error operation, so that warp of the substrate 1 is prevented by the warp preventive film 6.

In the long term, however, such a problem occurs that the surface of the plastic substrate 1 degenerates by hydrolysis due to moisture contained inside the substrate, or that the warp preventive film 8 itself deteriorates to exfoliate.

Besides, to prevent moisture absorption of the plastic substrate 1 with high water absorptivity, in some optical disk, each side of the plastic substrate 1 is coated with a transparent thin film of silicon nitride, silicon oxide, aluminum oxide or the like. However, on the surface of the plastic substrate 1 of the side for laminating the recording layer 3, the grooves for guiding the light beam are generally formed along the tracks, thereby to make its surface area wider, which increases the bonding force of the transparent thin film on the plastic substrate 1. On the contrary, the other surface of the plastic substrate 1 is formed as smooth as possible for preventing diffused reflection of the light beam for reading or reproducing information, so that the bonding force of the transparent thin film as the warp preventive film 6 is weaker.

Accordingly, as a method of enforcing the bonding force of an optical disk, it is known to etch the surface of the plastic substrate 1 with plasma prior to forming the warp preventive film 6. A method of enhancing the bonding force of a silicon nitride film by etching the substrate surface with Ar plasma at the time of forming the silicon nitride film on the polycarbonate substrate is reported, for example, in pages 83, 84 of Proc. Int. Symp. on Optical Memory, 1990.

It becomes evident, however, from the following experiments that under certain conditions the warp preventive film 6 manufactured by the above-mentioned method exfoliates, to the contrary. In these experiments, before forming a silicon nitride film of 1200 Å as a warp preventing film 6 on a transparent plastic substrate 1 of 86 mm$\phi$ in diameter, the surface of the plastic substrate 1 was etched with Ar plasma by varying input electric power and time for etching, and the obtained optical disks were investigated.

Table 1 shows the results of investigation on exfoliation of the warp preventive film 6 which was formed after etching the plastic substrate 1, under varying the conditions of the input electric power density P W/cm$^2$, which is the input electric power per unit area of etching surface, and the etching time T min. In the table, ○, △ and □ respectively indicate the case not showing any exfoliation of the warp preventive film 6 right after forming the warp preventive film 6, showing partial exfoliation on the disk surface, and showing exfoliation on the whole disk surface. ◉, ▲ and ■ respectively indicate the case of no exfoliation on the warp preventive film 6, partial exfoliation on the disk surface, and exfoliation on the entire disk surface, after the accelerated test of the optical disk having the warp preventive film 6 by holding in a thermo-hygrostat in an atmosphere of 80° C. and 90% RH for 3000 hours. Table 1 also shows measurements of the warp of the disk after forming the warp preventive film 6.

As clear from Table 1, if the etching condition P×T is less than 0.02, the warp preventive film 6 exfoliates. This is because the bonding force of the warp preventive film 6 on the plastic substrate 1 is not sufficient. On the other hand, the warp of the disk increases as P×T becomes larger, and when P×T exceeds 1.0, exfoliation occurs except for some part. This is due to the temperature rise of the surface of the plastic substrate 1 only on the side exposed to plasma at the time of etching, which results in warp of the plastic substrate 1, and the warped plastic substrate 1 straightens up due to the temperature lowering after forming the warp preventive film 6. It depends on the fact that different processes are undergone for the face and back of the substrate to cause deformation of the plastic substrate 1, and a stress applied to the warp preventive film 6 results in the exfoliation.

In such manufacturing method of an optical disk, if the product of the input electric power density P of the surface of the plastic substrate 1 and the etching time T exceeds a specified range, warp of the plastic substrate 1 and exfoliation of the warp preventive film 6 occur, thereby lowering the precision in focus servo control of the optical head.

SUMMARY OF THE INVENTION

The invention is intended to solve the above problems.

It is hence a first object of the invention to present an optical disk comprising a textured area of a minute embossment formed on the substrate surface on which a warp preventive film is bonded, so that the warp preventive film will not exfoliate for a long period.

It is a second object of the invention to present an optical disk capable of preventing a warp preventive film from exfoliation by covering the warp preventive film with a protective film.

It is a third object of the invention to present a method of manufacturing an optical disk for controlling the condition of etching to texture the substrate surface for enhancing the bonding force of a warp preventive film, so that the warp preventive film formed on thus textured substrate surface will not exfoliate for a long period.

The above and further objects and features of the invention will more fully be apparent from the following detailed description with accompanying drawings.

BRIEF DESCRIPTION OF THE DRAWINGS

FIG. 8 is a schematic sectional view of other sputtering device used in the optical disk manufacturing method of the invention.

DESCRIPTION OF THE PREFERRED EMBODIMENTS

Figure 1:
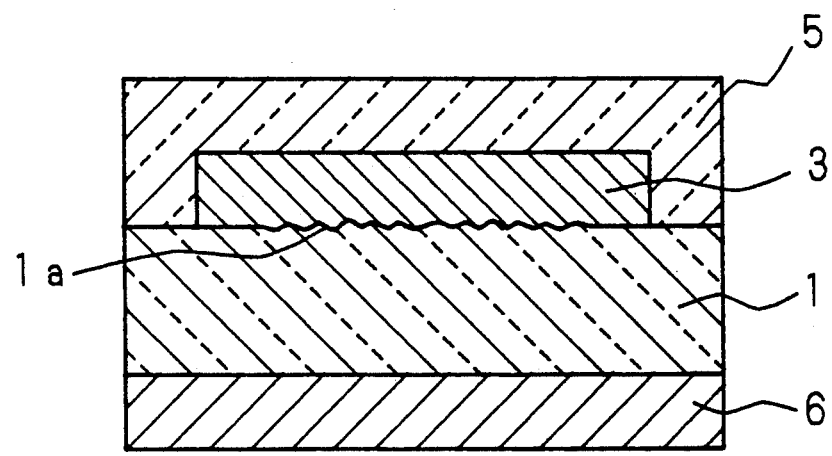
FIG. 1 is a partial sectional view of a conventional optical disk.

Referring now to the drawings, some of the embodiments of the invention will be described below in detail.

Figure 2:
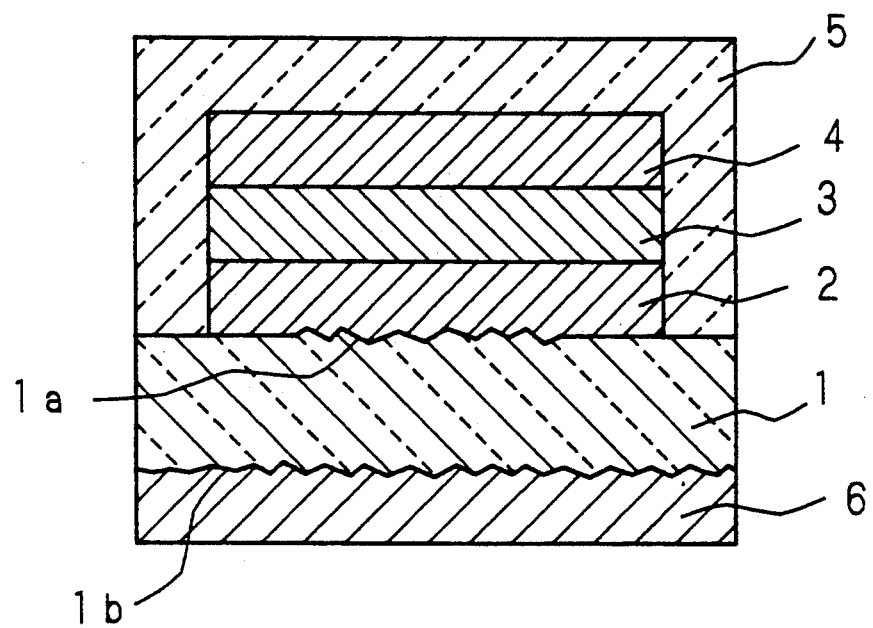
FIG. 2 is a partial sectional view of a first embodiment of an optical disk of the invention.

FIG. 2 is a partial sectional view of a first embodiment of the invention. In the drawing, numeral 1 denotes a polycarbonate substrate, 2 denotes an $Si_3N_4$ enhancement layer, 3 denotes a recording layer of a TbFeCo magnetic film, 4 denotes an $Si_3N_4$ protective layer, 5 denotes an epoxy resin protective layer, and 6 denotes a warp preventive film of $Si_3N_4$ dielectrics for preventing damage and moisture absorption of the substrate 1. On the plastic substrate 1 of the side for laminating the recording layer 3, guide grooves 1a are formed. On the other side of the plastic substrate 1, a textured area 1b is formed on the entire surface.

The manufacturing method of this optical disk will be explained below.

At the time of injection molding of a substrate, by preliminarily forming a minute embossment on the mirror side of the die, that is, the side of molding the textured area 1b of the substrate, a minute embossment will be formed on the mirror side of the substrate.

On the surface of the substrate 1 where the guide grooves 1a are formed, the $Si_3N_4$ enhancement layer 2, recording layer 3, and $Si_3N_4$ protective layer 4 are formed in this order by magnetron sputtering, and the resin protective layer 5 is formed by spin coat. On the other surface of the substrate, the warp preventive film 6 of $Si_3N_4$ dielectrics with 2100 Å thick is formed.

The recording and reproducing characteristic of this optical disk was investigated by laser beam of 830 nm in wavelength, and nearly the same recording and reproducing characteristic as the disk without the warp preventive film 6 was obtained. The film thickness is determined as to satisfy the value letting m=1 in the following general condition for minimizing the index of reflection;

film thickness $t = \lambda/2n \cdot m$ where $\lambda$: wavelength, n: refractive index, m: integer.

When this disk was put in an atmosphere of 80° C. and 90% RH for 1000 hours, the warp preventive film 6 of $Si_3N_4$ dielectrics did not exfoliate, which confirms high reliability.

Figure 3:
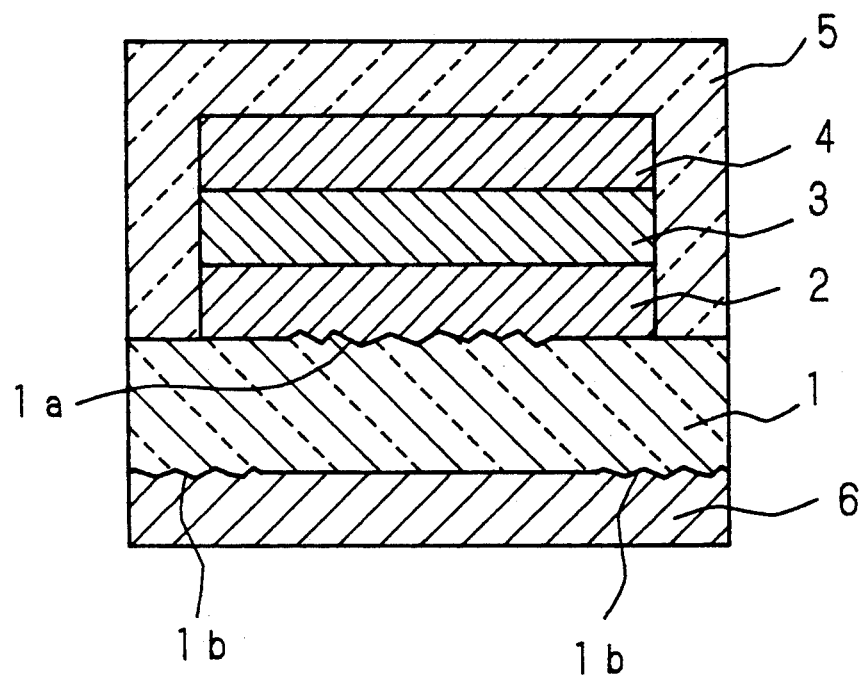
FIG. 3 is a partial sectional view of a modified example of the first embodiment of the optical disk of the invention.

FIG. 3 is a partial sectional view of a modified example of the first embodiment of the optical disk of the invention. The same parts as in the first embodiment are identified with the same reference numerals, and their explanations are omitted herein.

What is different from the first embodiment is that the textured area 1b is formed in the peripheral portion of the opposite surface of the substrate 1 to the surface for laminating the recording layer 3, which does not participate in recording and reproducing of information.

Therefore, when molding the substrate 1 by injection, by preliminarily forming a minute embossment on the portion of the mirror side of the die, that is, the side for forming the textured area 1b, which corresponds to the peripheral portion not participating in recording and reproducing, a minute embossment will be formed on the peripheral of the mirror side of the substrate.

The manufacturing method and the thickness of the warp preventive film 6 are the same as in the first embodiment.

When the recording and reproducing characteristic of this optical disk was investigated by laser beam of 830 nm in wavelength, nearly the same recording and reproducing characteristic as in the disk without the warp preventive film 6 was obtained.

When this disk was put in an atmosphere of 80° C. and 90% RH for 1000 hours, the warp preventive film 6 of $Si_3N_4$ dielectrics did not exfoliate, which confirms high reliability.

Figure 4:
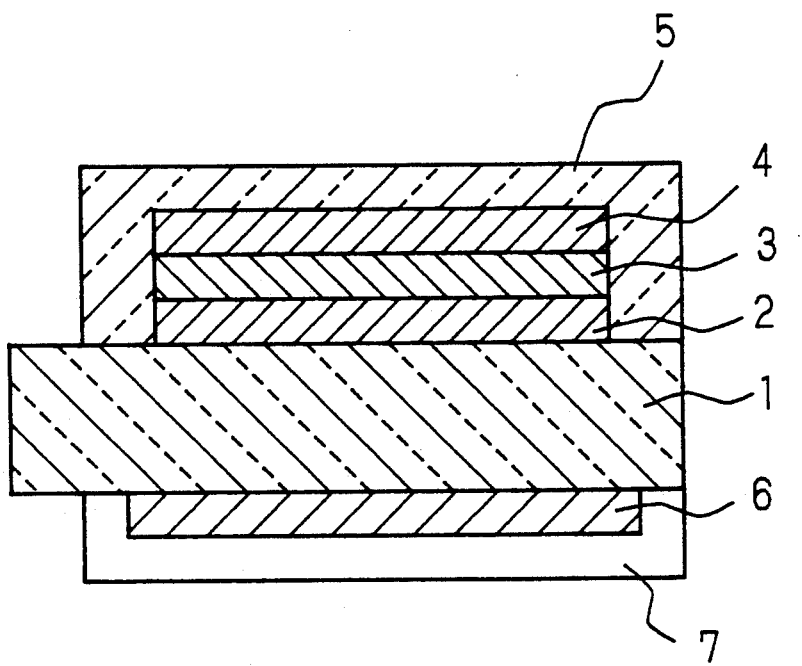
FIG. 4 is a partial sectional view of a second embodiment of an optical disk of the invention.

FIG. 4 is a partial sectional view of a second embodiment of the optical disk of the invention. The same parts as in the first embodiment are identified with the same reference numerals, and are not explained herein.

In this embodiment, the warp preventive film 6 is covered with a protective film 7 for preventing exfoliation of the warp preventive film 6.

The manufacturing method of this optical disk will be explained below. On the side of the substrate 1 where the guide grooves 1a are formed, the $Si_3N_4$ enhancement layer 2, recording layer 2 and $Si_3N_4$ protective layer 4 were formed in this order by magnetron sputtering, and the resin protective layer 5 was formed by spin coat. In an area of the opposite surface of the substrate 1, a warp preventive film 6 of $Si_3N_4$ dielectrics with 2100 Å thick was formed.

The recording and reproducing characteristic of this optical disk was investigated with laser beam of 830 nm in wavelength, and nearly the same recording and reproducing characteristic as the disk without the warp preventive film 6 was obtained.

Next, after forming an ultra violet setting resin film by spin coat so as to cover the entire surface of the warp preventive film 6 of $Si_3N_4$ dielectrics, it was set by an ultraviolet irradiation equipment to form a protective film for preventing exfoliation of the warp preventive film 6.

As the protective film 6, a material with equivalent refractive index to the polycarbonate used for the substrate 1 is desirable, but aside from an ultraviolet setting resin, thermosetting resin such as epoxy resin may be used.

When this optical disk was put in an atmosphere of 80° C. and 90% RH for 1000 hours, the warp preventive film 6 of $Si_3N_4$ dielectrics did not exfoliate, which confirms high reliability.

Meanwhile, when a disk was manufactured in the same manner as in the first embodiment except that an $Al_2O_3$ film of 2600 Å thick with the refractive index of about 1.6 was used for the warp preventive film 6 instead of $Si_3N_4$ dielectrics, and put in an atmosphere of 80° C. and 90% RH for 1000 hours, exfoliation of the $Al_2O_3$ film 6 was not observed, which confirms high reliability.

Similarly, when a disk was manufactured in the same manner as in the first embodiment except that an SiO film of 2500 Å thick with the refractive index of about 1.7 was used for the warp preventive film 6 instead of $Si_3N_4$ dielectrics and put in an atmosphere of 80° C. and 90% RH for 1000 hours, exfoliation of the SiO film 6 was not observed, which confirms high reliability.

When a disk was manufactured in the same manner as in the first embodiment except that an $SiO_2$ film of 2800 Å thick with the refractive index of about 1.5 was used for the warp preventive film 6 instead of $Si_3N_4$ dielectrics and put in an atmosphere of 80° C. and 90% RH for 1000 hours, exfoliation of the $SiO_2$ film 6 was not observed, which confirms high reliability.

When a disk was manufactured in the same manner as in the first embodiment except that an SiON film of 2600 Å thick with the refractive index of about 1.6 was used for the warp preventive film 6 instead of $Si_3N_4$ dielectric and put in an atmosphere of 80° C. and 90% RH for 1000 hours, exfoliation of SiON film 6 was not observed, which confirms high reliability.

When a disk was manufactured in the same manner as in the first embodiment except that a $Ta_2O_5$ film of 2000 Å thick with the refractive index of about 2.1 was used for the warp preventive film 6 instead of $Si_3N_4$ dielectrics and put in an atmosphere of 80° C. and 90% RH for 1000 hours, exfoliation of the $Ta_2O_5$ film 6 was not observed, which confirms high reliability.

When a disk was manufactured in the same manner as in the first embodiment except that an AlN film of 2300 Å thick with the refractive index of about 1.8 was used for the warp preventive film 6 instead of $Si_3N_4$ dielectrics and put in an atmosphere of 80° C. and 90% RH for 1000 hours, exfoliation of the AlN film 6 was not observed, which confirms high reliability.

When a disk was manufactured in the same manner as in the first embodiment except that an AlSiN film of 2000 Å thick with the refractive index of about 2.1 was used for the warp preventive film 6 instead of $Si_3N_4$ dielectrics and put in an atmosphere of 80° C. and 90% RH for 1000 hours, exfoliation of the AlSiN film 6 was not observed, which confirms high reliability.

When a disk was manufactured in the same manner as in the first embodiment except that an SiAlON film of 2100 Å thick with the refractive index of about 2.0 was used for the warp preventive film 6 instead of $Si_3N_4$ dielectrics and put in an atmosphere of 80° C. and 90% RH for 1000 hours, exfoliation of the SiAlON film 6 was not observed, which confirms high reliability.

When a disk was manufactured in the same manner as in the first embodiment except that a ZnS film of 1800 Å thick with the refractive index of about 2.3 was used for the warp preventive film 6 instead of $Si_3N_4$ dielectrics and put in an atmosphere of 80° C. and 90% RH for 1000 hours, exfoliation of the ZnS film 6 was not observed, which confirms high reliability.

When a disk was manufactured in the same manner as in the first embodiment except that a $ZnS-SiO_2$ film of 2100 Å thick with the refractive index of about 2.0 was used for the warp preventive film 6 instead of $Si_3N_4$ dielectrics and put in an atmosphere of 80° C. and 90% RH for 1000 hours, exfoliation of the $ZnS-SiO_2$ film 6 was not observed, which confirms high reliability.

When a disk was manufactured in the same manner as in the first embodiment except that an $ZnSe-SiO_2$ film of 2100 Å thick with the refractive index of about 2.0 was used for the warp preventive film 6 instead of $Si_3N_4$ dielectrics and put in an atmosphere of 80° C. and 90% RH for 1000 hours, exfoliation of the $ZnSe-SiO_2$ film 6 was not observed, which confirms high reliability.

When a disk was manufactured in the same manner as in the first embodiment except that an AlGeN film of 2000 Å thick with the refractive index of about 2.1 was used for the warp preventive film 6 instead of $Si_3N_4$ dielectrics and put in an atmosphere of 80° C. and 90% RH for 1000 hours, exfoliation of the AlGeN film 6 was not observed, which confirms high reliability.

Figure 5:
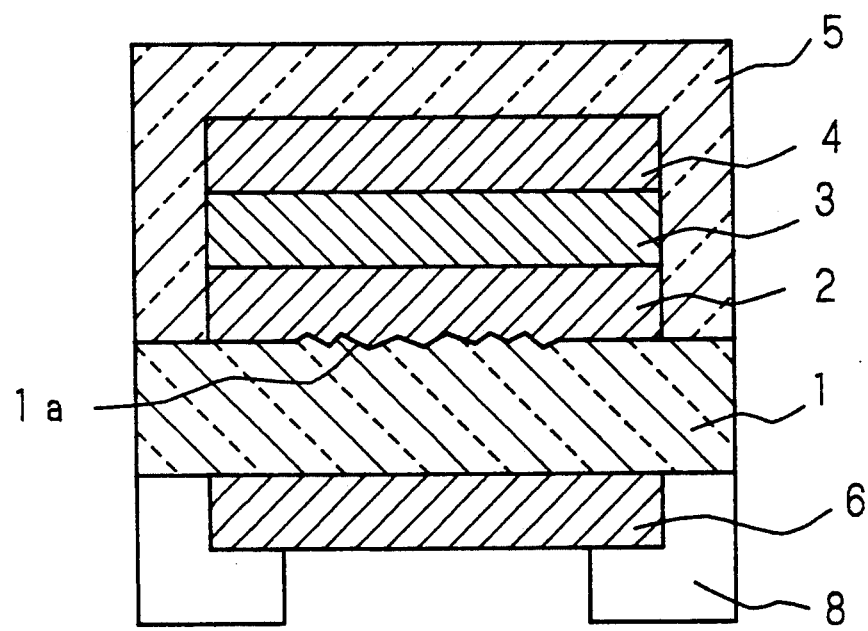
FIG. 5 is a partial sectional view of a modified example of the second embodiment of the optical disk of the invention.

FIG. 5 is a partial sectional view of a modified example of the second embodiment of the optical disk of the invention.

The same parts as in the second embodiment are identified with the same reference numerals, and their explanations are omitted herein.

In this modified example, taking note of the fact that exfoliation of the warp preventive film 6 mainly initiates from the boundary, boundary protective films 8 for preventing exfoliation of the warp preventive film 6 are formed at the inner and outer peripheral boundaries between the warp preventive film 6 and substrate 1.

The manufacturing method of this optical disk will be explained below. On the surface of the polycarbonate substrate 1 of 90 mm in diameter where the guide grooves 1a are formed, an $Si_3N_4$ enhancement layer 2, a recording layer 3 of TbFeCo magnetic film, and an $Si_3N_4$ protective layer 4 were laminated in this order by magnetron sputtering in the range of 18 to 43 mm in radius, and a resin protective film 5 was formed by spin coat. Of this range, a region used for recording and reproducing information is from 23 to 40 mm in radius.

In a region of 18 mm to 43 mm in radius on the opposite surface of the polycarbonate substrate 1, a warp preventive film 6 of $Si_3N_4$ dielectrics was formed in 2100 Å thick. The recording and reproducing characteristic was investigated with laser beam of 830 nm in wavelength, and nearly the same recording and reproducing characteristic was achieved as in the disk without the warp preventive film 6 of $Si_3N_4$ dielectrics.

Next, in order to cover the boundaries between the substrate 1 and the inner and outer peripheral warp preventive film 6 corresponding to the range of 15 to 22 mm and 41 to 44 mm in radius, films cut out in annular forms of 15 to 22 mm and 41 to 44 mm in radius and coated with press adhesive were bonded to obtain the boundary protective films 8.

When this disk was put in an atmosphere of 80° C. and 90% RH for 1000 hours, the warp preventive film 6 of $Si_3N_4$ dielectrics did not exfoliate, which confirms high reliability.

Meanwhile, in the foregoing embodiments and their modified examples, the $Si_3N_4$ enhancement layer 2 and $Si_3N_4$ protective layer 4 are disposed on the both sides of the recording layer 3, but the same effects as in the above embodiments are obtained by the disk with the recording layer alone.

Figure 6:
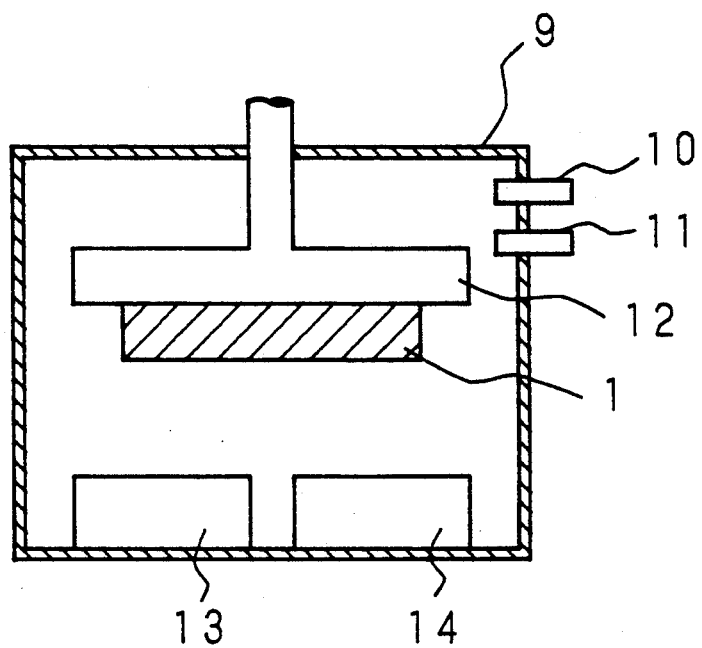
FIG. 6 is a schematic sectional view of a sputtering device used in an optical disk manufacturing method of the invention.

FIG. 6 is a schematic sectional view of a sputtering device used in the manufacturing method of the optical disk of the invention. In the diagram, numeral 9 denotes a vacuum chamber, 10 denotes an Ar gas introducing port, 11 denotes an $N_2$ gas introducing port, 12 denotes a substrate holder for linking the plastic substrate 1 to the rotary mechanism by holding it, 13 denotes a silicon target, and 14 denotes a TbFeCo target.

Figure 7:
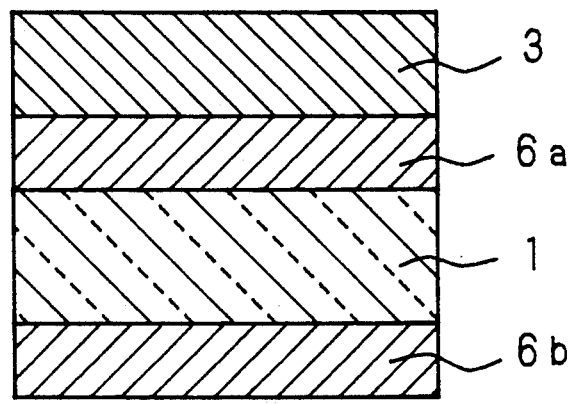
FIG. 7 is a partial sectional view of an optical disk manufactured by the sputtering device shown in FIG. 6.

A method of manufacturing an optical disk as shown in FIG. 7 by using the sputtering device shown in FIG. 6 will be explained below.

The optical disk shown in FIG. 7 has a silicon nitride film 6a for preventing moisture absorption of the substrate 1 formed on the same side of the plastic substrate 1 with the surface for laminating the recording layer 3, while a warp preventive film 6b of silicon nitride film is formed on the opposite surface of the substrate 1.

In the first place, the substrate holder 12 holding the plastic substrate 1 is rotated. After introducing the Ar gas and $N_2$ gas from the introducing ports 10, 11, respectively, a high voltage in direct current is applied to the silicon target 13 and the silicon nitride film 6a is formed by reactive sputtering. After stopping introduction of the $N_2$ gas, by applying a high voltage in direct current to the TbFeO target 14, the recording layer 3 of the TbFeCo film is formed. After turning over the plastic substrate 1 and resetting it to the substrate holder 12, the vacuum chamber 9 is evacuated again and the Ar gas is introduced to the vacuum chamber 9.

Consequently, a high voltage of high frequency is applied to the substrate holder 12 to generate Ar plasma. By this plasma discharge, the surface of the transparent plastic substrate 1 opposite to the recording layer 3 is etched by Ar ion. In this case, the surface area of one side of the substrate holder 12 is 2500 cm$^2$, and the input electric power of high frequency is 500 watt, and hence the input electric power density P is 0.2 watt/cm$^2$, and the etching time T is 5 minutes. Therefore, the product of P and T is 1.0, which satisfies the condition of $0.02 \leq P \times T \leq 1.00$. After this etching process, the $N_2$ gas is introduced in addition to the Ar gas, thereby forming the silicon nitride film 6b as the transparent warp preventive film in the same manner as the protective film 6a of silicon nitride. Thus, by settling the product of the etching input electric power P and etching time T within the specified range obtained from the above experimental result, an optical disk having a transparent warp preventive film 6 with enough bonding force is obtained.

FIG. 8 is a schematic diagram of other sputtering device for executing the method of the invention, in which 9a, 9b, 9c denote first, second and third vacuum chambers, 10a, 10b, 10c denote Ar gas introducing ports attached to the vacuum chambers 9a, 9b, 9c, and 11 denotes an $N_2$ gas introducing port attached to the second vacuum chamber 9b. Besides, 13a, 13b denote silicon targets, 14 denotes a TbFeCo target, and 15a, 15b denote dummy targets for plasma etching. The transparent plastic substrate 1 is transferable as indicated by dotted lines among the vacuum chambers 9a, 9b, 9c through door valves 16, 17 and held by the substrate holder not shown in the drawing in such a manner that the side where the recording layer 3 is to be formed faces the TbFeCo target 14.

The procedure of forming the optical disk by this sputtering device will be described.

First, the transparent plastic substrate 1 is positioned between the two dummy targets 15a, 15b in the first vacuum chamber 9a, and the Ar gas introducing port 10a is opened to introduce the Ar gas. A high voltage of high frequency is applied to the substrate holder to generate Ar plasma. By this plasma discharge, the Ar ion etches the both sides of the transparent plastic substrate 1. In this case, since the surface area of one side of the substrate holder is 2000 cm$^2$ therefore 4000 cm$^2$ for the both sides and the input electric power of high frequency is 600 watt, the input electric power density P is 0.15 watt/cm$^2$, and the etching time T is 4 minutes. As a result, the product of P and T is 0.6, which satisfies the condition of $0.02 \leq P \times T \leq 1.00$.

Next, the transparent plastic substrate 1 is positioned between two silicon targets 13a, 13b in the second vacuum chamber 9b, and the Ar gas and $N_2$ gas are introduced, and a high voltage in direct current is applied to two silicon targets 13a, 13b to generate plasma. As a result, reactive sputtering of silicon occurs, and the silicon nitride thin films 6a, 6b are formed on the both surfaces of the plastic substrate 1.

Furthermore, the transparent plastic substrate 1 is positioned above the TbFeCo target 14 in the third vacuum chamber 9c, the Ar gas is introduced, and a high voltage in direct current is applied to the TbFeCo target 14 to generate plasma. As a result, sputtering of the TbFeCo occurs, and the recording layer 3 of TbFeCo thin film is formed on one side of the transparent plastic substrate 1. Though it is desirable to form the silicon nitride films simultaneously as mentioned above, if it is impossible due to some restriction, they may be laminated sequentially.

The optical disks fabricated by these two sputtering devices were, whether right after the forming or after holding them for 3000 hours in an atmosphere of 80° C. and 90% RH, completely free from exfoliation of the silicon nitride film, and the high reliability is confirmed. Besides, the warp of the optical disk obtained by using the sputtering device in FIG. 6 was 2.34 mrad, which is small enough in practical use. As for the optical disk obtained by using the sputtering device in FIG. 8, the warp in the case of sequentially laminating the silicon nitride films on the both sides of the transparent plastic substrate was 1.10 mrad, and the warp in the case of simultaneously laminating the silicon nitride films on the both sides of the transparent plastic substrate 1 was 0.88 mrad, both indicating more favorable results.

In the foregoing embodiments, the transparent thin films 6a, 6b formed on the both sides of the substrate were the same silicon nitride films, but they may be different in compositions, as long as transparent materials with dense structures such as aluminum nitride film, silicon oxide film, aluminum oxide film, tantalum oxide film or the like are used, the same effects as in the foregoing embodiments will be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

TABLE 1

| disk name | plasma etching condition P (W/cm²) | T (min) | P × T | exfoliation state just after lamination | after accelerated test | disk warp (mrad) |
|---|---|---|---|---|---|---|
| a | 0 | 0 | 0.000 | Δ | ■ | 1.21 |
| b | 0.005 | 1 | 0.005 | Δ | ■ | 1.03 |
| c | 0.005 | 2 | 0.010 | ○ | ▲ | 1.19 |
| d | 0.010 | 1 | 0.010 | ○ | ▲ | 2.05 |
| e | 0.005 | 4 | 0.020 | ○ | ⊙ | 1.85 |
| f | 0.010 | 2 | 0.020 | ○ | ⊙ | 1.65 |
| g | 0.010 | 10 | 0.100 | ○ | ⊙ | 2.33 |
| h | 0.020 | 5 | 0.100 | ○ | ⊙ | 1.84 |
| i | 0.050 | 2 | 0.100 | ○ | ⊙ | 2.01 |
| j | 0.050 | 10 | 0.500 | ○ | ⊙ | 3.45 |
| k | 0.100 | 5 | 0.500 | ○ | ⊙ | 2.54 |
| l | 0.250 | 2 | 0.500 | ○ | ⊙ | 3.19 |
| m | 0.100 | 10 | 1.000 | ○ | ⊙ | 3.07 |
| n | 0.200 | 5 | 1.000 | ○ | ⊙ | 3.85 |
| o | 0.500 | 2 | 1.000 | ○ | ⊙ | 3.68 |
| p | 0.110 | 10 | 1.100 | ○ |  | 4.90 |
| q | 0.220 | 5 | 1.100 | ○ | ⊙ | 5.39 |
| r | 0.550 | 2 | 1.100 | Δ | ▲ | 5.10 |
| s | 0.120 | 10 | 1.200 | ○ | ▲ | 6.48 |
| t | 0.240 | 5 | 1.200 | Δ | ▲ | 6.12 |
| u | 0.600 | 2 | 1.200 | Δ | ▲ | 5.36 |
| v | 0.130 | 10 | 1.300 | ○ | ▲ | 7.87 |
| w | 0.260 | 5 | 1.300 | Δ | ▲ | 7.47 |
| x | 0.650 | 2 | 1.300 | Δ | ▲ | 7.92 |
| y | 0.150 | 10 | 1.500 | Δ | ▲ | 9.97 |
| z | 0.750 | 2 | 1.500 | □ | ■ | 9.18 |

What is claimed is:

1. An optical disk comprising:
   a substrate made of translucent material, having opposite first and second sides,
   a recording film formed on the second side of the substrate,
   a warp preventive film formed on the first side of said substrate, for preventing warp of the substrate, and
   a protective film disposed on and contacting the warp preventive film and the first side of said substrate, for preventing the warp preventive film from exfoliation.

2. An optical disk as set forth in claim 1, wherein said protective film contacts said substrate adjacent said warp preventive film.

3. An optical disk as set forth in claim 1, wherein said protective film only contacts said first side of said substrate.

4. An optical disk as set forth in claim 1, wherein said protective film only contacts said first side of said substrate absent any portion of said protective film extending over said second side of said substrate.

5. An optical disk comprising:
   a substrate of translucent material, having opposite first and second surfaces, wherein said second surface has a grooved area;
   a recording film, having opposite first and second sides, wherein said recording film first side is facing said substrate second surface;
   a warp preventive film having opposite first and second sides, wherein said second side is facing said substrate first surface; and
   a protective film means for minimizing exfoliation of said warp preventive film, said protective film means contacts at least a portion of said first side of said warp preventive film and a portion of said substrate first surface.

6. An optical disk as set forth in claim 5, wherein an enhancement layer is positioned between said substrate second surface and said recording film firs side; and
   a protective layer, having opposite first and second sides, wherein said protective layer first side is facing said recording layer second side.

7. An optical disk as set forth in claim 6, wherein a protective epoxy resin layer contacts said substrate second surface, said enhancement layer, said recording film, and said protective layer.

8. An optical disc as set forth in claim 7, wherein said enhancement layer and said protective layer are made of $Si_3N_4$.

9. An optical disc asset forth in claim 5, wherein said protective film means completely covers said warp preventive film first side.

10. An optical disk as set forth in claim 9, wherein an enhancement layer is positioned between said substrate second surface and said recording film first side; and
   a protective layer, having opposite first and second sides, wherein said protective layer first side is facing said recording layer second side.

11. An optical disk as set forth in claim 10, wherein a protective epoxy resin layer contacts said substrate second surface, said enhancement layer, said recording film, and said protective layer.

12. An optical disc as set forth in claim 11, wherein said enhancement layer and said protective layer are made of $Si_3N_4$.

13. An optical disk as set forth in claim 5, wherein said protective film only contacts said first side of said substrate.

14. An optical disk as set forth in claim 5, wherein said protective film only contacts said first side of said substrate absent any portion of said protective film extending over said second side of said substrate.

* * * * *